(12) United States Patent
Phielipp

(10) Patent No.: US 10,791,368 B2
(45) Date of Patent: Sep. 29, 2020

(54) SYSTEMS, METHODS, AND COMPUTER PROGRAM PRODUCTS FOR CAPTURING NATURAL RESPONSES TO ADVERTISEMENTS

(75) Inventor: Mariano J. Phielipp, Mesa, AZ (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 13/994,784

(22) PCT Filed: Dec. 14, 2011

(86) PCT No.: PCT/US2011/064913
§ 371 (c)(1),
(2), (4) Date: Oct. 17, 2013

(87) PCT Pub. No.: WO2013/089703
PCT Pub. Date: Jun. 20, 2013

(65) Prior Publication Data
US 2014/0109120 A1    Apr. 17, 2014

(51) Int. Cl.
*H04N 21/442*    (2011.01)
*G06Q 30/02*    (2012.01)

(52) U.S. Cl.
CPC ....... *H04N 21/44218* (2013.01); *G06Q 30/02* (2013.01)

(58) Field of Classification Search
None
See application file for complete search history.

(56) References Cited

U.S. PATENT DOCUMENTS 5,373,315 A * 12/1994 Dufresne et al. ............. 725/11
7,086,075 B2 * 8/2006 Swix et al. .................. 725/10

(Continued)

FOREIGN PATENT DOCUMENTS

| KR | 10-2010-0039706 A | 4/2010 |
| KR | 10-2011-0075469 A | 7/2011 |
| WO | 2013089703 A1 | 6/2013 |

OTHER PUBLICATIONS

International Search Report and Written Opinion received for International Application No. PCT/US2011/64913, dated Jul. 30, 2012, 9 pages.

(Continued)

*Primary Examiner* — Fernando Alcon

(57) ABSTRACT

Systems, methods, and computer program products described herein may allow for the capture of a user's reaction to an advertisement. The reaction may be verbal or may take the form of a gesture. Once the reaction is captured, the reaction may be interpreted to infer whether the user's opinion of the advertised product or service is positive. The opinion may be combined with metadata that is associated with the advertisement. The metadata may include the identity of the product or service being advertised and/or may include the identity of the advertiser, i.e., the producer or source of the product or service. The combination of the user's identity information, the metadata, and the user's opinion may collectively represent the user's interest in the advertised product or service. This interest information may be saved in a wish list or shopping list for the user, and may be stored via a network at a location removed from the user, i.e., "in the cloud." The interest information may then be made accessible to the advertiser and/or to providers of related products or services. The interest information may be used by these advertisers and providers to identify the user as a possible recipient of additional information or advertising related to the advertised product or related products.

18 Claims, 7 Drawing Sheets

(56) References Cited

U.S. PATENT DOCUMENTS

| | | | |
|---|---|---|---|
| 7,937,724 B2 * | 5/2011 | Clark et al. | 725/35 |
| 8,495,671 B1 * | 7/2013 | Ribeiro et al. | 725/13 |
| 2001/0032333 A1 * | 10/2001 | Flickinger | G06Q 30/02 |
| | | | 725/39 |
| 2002/0072952 A1 | 6/2002 | Hamzy et al. | |
| 2002/0092019 A1 * | 7/2002 | Marcus | G11B 27/034 |
| | | | 725/37 |
| 2002/0104090 A1 * | 8/2002 | Stettner | 725/60 |
| 2006/0026064 A1 * | 2/2006 | Collins | G06Q 10/00 |
| | | | 705/14.42 |
| 2007/0107008 A1 * | 5/2007 | Dybus | 725/9 |
| 2007/0150916 A1 * | 6/2007 | Begole et al. | 725/10 |
| 2008/0169930 A1 | 7/2008 | Mallinson | |
| 2009/0112656 A1 | 4/2009 | Jung et al. | |
| 2010/0088714 A1 * | 4/2010 | Hawkins | H04H 20/14 |
| | | | 725/14 |
| 2010/0094860 A1 * | 4/2010 | Lin | G06Q 30/02 |
| | | | 707/709 |
| 2010/0262456 A1 * | 10/2010 | Feng | G06Q 30/02 |
| | | | 705/14.3 |
| 2012/0124604 A1 * | 5/2012 | Small et al. | 725/12 |
| 2012/0297409 A1 * | 11/2012 | Zaslavsky et al. | 725/10 |
| 2012/0324494 A1 * | 12/2012 | Burger | H04H 60/33 |
| | | | 725/12 |
| 2013/0132983 A1 * | 5/2013 | Yadavalli | 725/13 |
| 2013/0179910 A1 * | 7/2013 | Hio | 725/10 |

OTHER PUBLICATIONS

International Preliminary Report on Patentability received for International Application No. PCT/US2011/64913, dated Jun. 26, 2014, 6 pages.

* cited by examiner

SYSTEMS, METHODS, AND COMPUTER PROGRAM PRODUCTS FOR CAPTURING NATURAL RESPONSES TO ADVERTISEMENTS

BACKGROUND

During the normal course of a television viewing session, a viewer may be exposed to a number of advertisements for a variety of products and services. While the viewer may not have any particular reaction to most of these advertisements, sometimes the viewer may have a distinct reaction, whether positive or negative.

There is a clear benefit to the advertiser if such distinct reactions are conveyed to the advertiser. A positive reaction may imply a desire for the product or for similar products in the same category. If the advertiser knows that a person is interested in a particular product, the advertiser could follow-up with additional advertising or other supplemental information that may increase the persons interest or satisfy the person's curiosity. Such additional information may enhance sales prospects. Moreover, vendors of products that are similar to the advertised. product may also take advantage of such interest. These vendors may likewise choose to provide additional advertising to the viewer.

Currently, there are systems that allow the capture of a viewer's reaction to advertising. These systems, however, require the viewer to press a button on a remote control, click on a field on a display, or otherwise indicate interest through a user interface device. This may require the viewer to locate and pick up some user interface device, locate an appropriate button or field, then register his indication of interest. This can be cumbersome and inconvenient for user; this may be so cumbersome, in fact, that the viewer may not even bother with this process. As a result, an advertiser may never learn that a particular viewer has some interest in an advertised product.

BRIEF DESCRIPTION OF THE DRAWINGS/FIGURES

Figure 1:
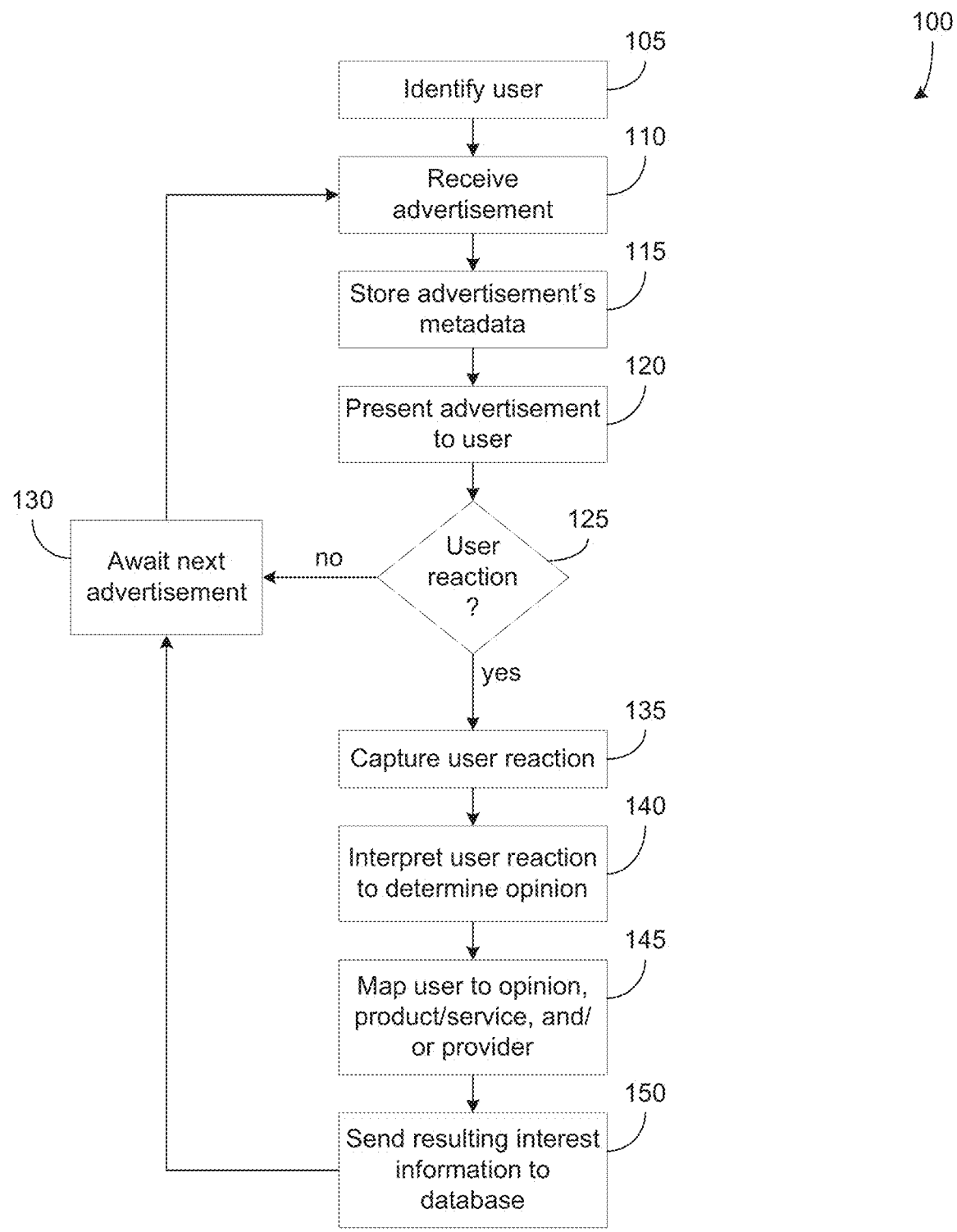
FIG. 1 is a flowchart illustrating the processing performed at a user's location by the systems described herein, according to an embodiment.

In the drawings, the leftmost digit(s) of a reference number identifies the drawing in which the reference number first appears.

DETAILED DESCRIPTION

An embodiment is now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

The systems, methods, and computer program products described herein may allow for the capture of a user's reaction to an advertisement. The reaction may be verbal or may take the form of a natural gesture. Once the reaction is captured, the reaction may be interpreted to infer whether the user's opinion of the advertised productor service is positive. The opinion may be combined with metadata that is associated with the advertisement. The metadata may include the identity of the product or service being advertised and/or may include the identity of the advertiser, i.e., the producer or source of the productor service. The combination of the user's identity information, the metadata, and the user's opinion collectively represent the user's interest in the advertised product or service. This interest information may be saved in a wish list or shopping list for the user, and may be stored via a network at a location removed from the user, i.e., "in the cloud." The interest information may then be made accessible to the advertiser and/or to providers of related products or services. The interest information may be used by these advertisers and providers to identify the user as a possible recipient of additional information or advertising related to the advertised product or related products. In addition, the interest information may be accessed by the user himself, if interest information is stored for one or more products or services, the user may use the collective interest information as a wish list or shopping list. The user may then choose to act on the list and buy items.

The processing of the systems described herein is illustrated in FIG. 1, according to an embodiment. At 105, a user may be identified. The user may be identified by logging in to a computing device or home entertainment system to access television programming, streaming video, or other media content. Alternatively, the user may be identified by biometric means. In addition, the user may not be a specific person, but may instead refer to collective members of a household. For example, the user may be identified by an Internet protocol address, in which case all persons accessing media through this address may be viewed collectively as the user.

At 110, an advertisement may be received at the user's home entertainment system or computing device. Metadata that is associated with the advertisement may be saved at 115. This metadata may be stored on a memory device connected to or integrated with the user's home entertainment system/computing device. At 120, the advertisement may be presented to the user.

At 125, a determination may be made as to whether the user has reacted to the advertisement. The reaction of the user may be verbal. In this case, the utterances of the user may be captured and recorded via a microphone connected to the home entertainment system or computing device, at 135. Alternatively, the user reaction may be a natural gesture. In this case, the gesture may be captured and recorded by a camera or other motion sensing apparatus connected to the home entertainment system or computing device at 135. If there is no user reaction, the process may continue at 130, where the next advertisement may be awaited. Moreover, the system described herein may be embodied, at least in part, in a portable device, such as a remote control or cell phone. In such a case, any camera and/or microphone may be embodied in the portable device.

At 140, the user reaction captured at 135 may be analyzed and interpreted to determine the opinion being expressed by the user. In the case of a verbal reaction, captured words and phrases may be searched for positive terms that may suggest a positive opinion. Such terms may include "yes," "I like that," "I need that," and "I could use that" for example. As would be understood by a person of ordinary skill in the art, additional phrases and words may be considered. In an embodiment, a training phase may be required to train a software implementation of interpretation logic as to the interpretation of such words. Such a training phase may be required when the system is used for the first time by the user. Note that in an embodiment, negative opinions may also be noted. In such an embodiment, captured words may be searched for terms such as "no," or "I would never buy that" for example.

The reaction of the user may also take the form of a natural gesture. Here, the captured gesture may be analyzed for particular motions that suggest a positive opinion, such as a thumbs-up gesture, a fist pump, or a smile for example. In an embodiment, the interpretation of such a gesture does not require that the user manipulate any particular user interface device, such as a keypad of pointing device. Rather, the user may only need to act naturally. In this sense, the gestures that are captured and analyzed are natural gestures. In an embodiment, a training phase may be required to train a software implementation of interpretation logic as to the interpretation of such gestures. Such a training phase may be required when the system is used for the first time by the user.

At 145, user's identity and the opinion inferred by the interpretation of the user's words or gestures may be associated with metadata relating to the advertisement. In this way, the user's opinion may be mapped to the product or service advertised and/or to the advertiser. These pieces of information may be collectively referred to herein as interest information. In an embodiment, the date and time at which the advertisement was presented may also be included. At 150, the interest information may be sent to a database or other data structure. The aggregated interest information for the user, covering the set of products or services in which the user has expressed interest, may be treated as a wish list or shopping list for the user. In an embodiment, this database may be located somewhere other than the user's location. This database may be implemented on a server or other computing device that may be accessed via a data network, such as the Internet.

Figure 2:
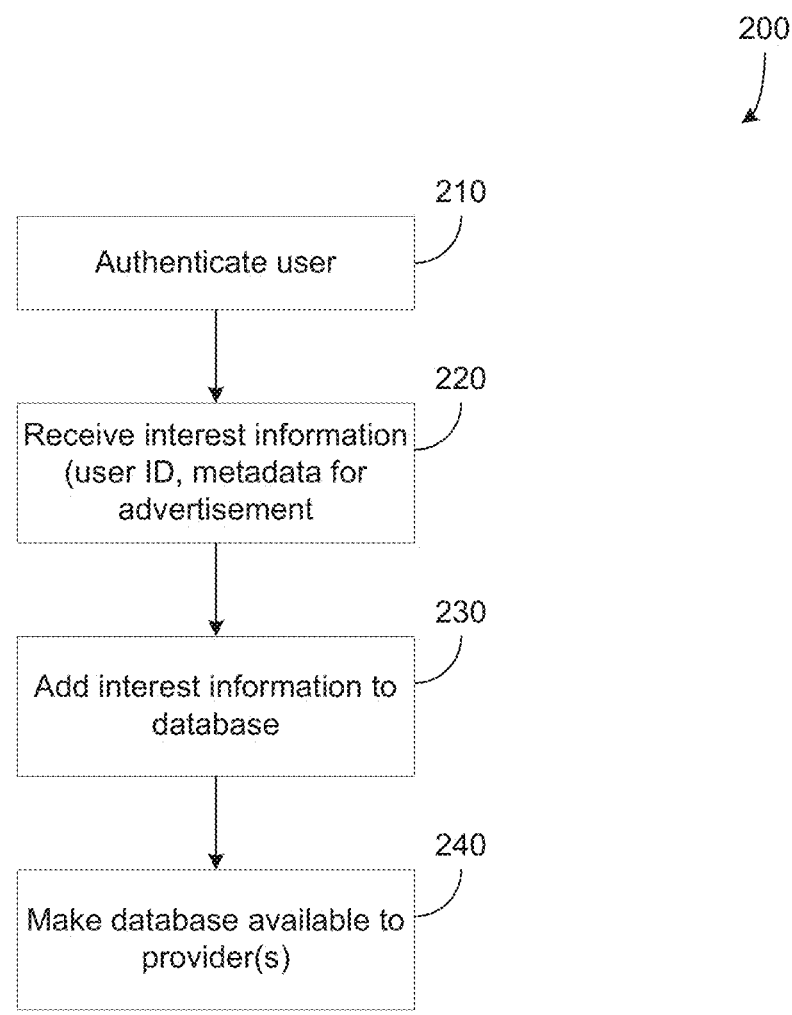
FIG. 2 is a flowchart illustrating the receipt and processing of a user's interest information, according to an embodiment.

The processing performed at such a server or computing device is illustrated in FIG. 2, according to an embodiment. At 210, the source of the interest information (i.e., the user and/or his computing device) maybe authenticated. At 220, the interest information may be received. At 230, the interest information may be added to a database or other data structure.

At 240, the contents of this database or other data structure may be made available to interested parties. These parties may include the advertiser, who would be interested in knowing that the user reacted positively (or negatively) to an advertised product or service. This may allow the advertiser to provide additional advertising or other related information to the user. Such related information may include product details, pricing, availability, locations of retail outlets, or shipping information for the advertised product, for example. Note that such additional advertising and related information may take the form of additional advertisements presented in the user's media content, or may take the form of e-mails or physical hardcopy mailings, for example.

Parties accessing the interest information may also include providers of competing products or services, or providers of related complementary products or services. If, for example, the user has reacted positively to an advertisement for a hotel chain, competing hotel chains may be interested in this fact and may wish to provide advertising or other information related to their own hotels. Moreover, the users interest in a hotel chain may be interpreted as indicating that the user is planning a trip. As a result, a car rental company may be interested in knowing that the user expressed interest in a hotel chain, and may provide to the user advertising related to the car rental company. This latter example represents an example of a product or service (car rental) that is complementary to the originally advertised product or service (a hotel).

Figure 3:
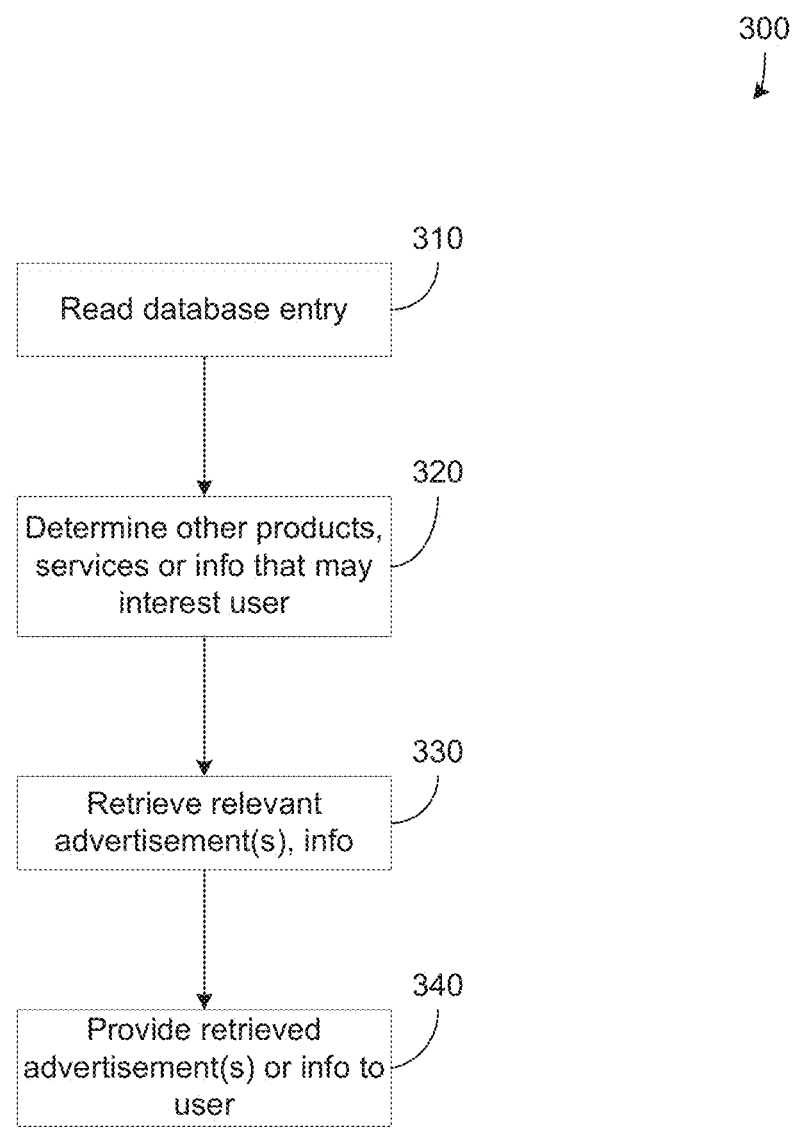
FIG. 3 is a flowchart illustrating access to interest information, according to an embodiment.

Access to interest information and responses to this information are illustrated in FIG. 3. At 310, interest information may be read. If the interest information is stored in a database, the interest information may take the form of a database entry. At 320, a party may use the interest information to determine other products, services or information that may interest the user. At 330, relevant advertising or other related information may be retrieved. At 340, this advertising or information may be provided to the user.

Figure 4:
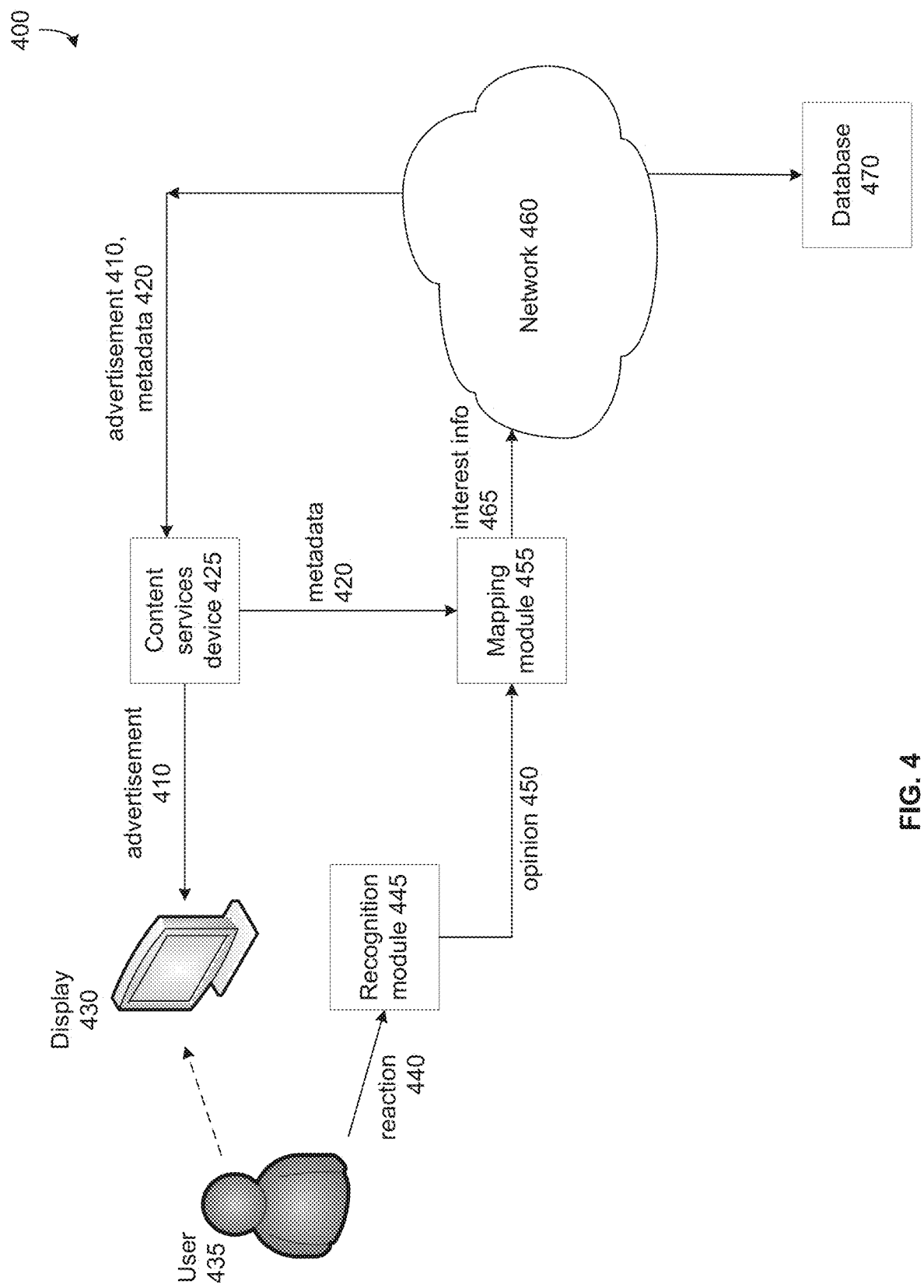
FIG. 4 is a block diagram illustrating the system and processing described herein, according to an embodiment.

A larger system in which the above functionality may be embodied is illustrated in FIG. 4. In the illustrated embodiment, an advertisement 410 is received at the user location at a content services device 425. In this example, the advertisement 410 is received via a network 460. As would be understood by a person of ordinary skill in the art, other means of delivery are possible. The content services device 425 may be part of a computing device, such as a desktop personal computer, a laptop computer, or a handheld device. Alternatively, the content services device 425 may be a set-top box. Along with the advertisement 410, metadata 420 may also be delivered. Metadata 420 may include the identity of the product or service being advertised and/or the identity of the advertiser. The advertisement 410 may be sent from the content services device 425 to a display device 430.

The advertisement 410 may be viewed by the user 435. The user 435 may then exhibit some reaction 440. As noted above, this reaction may be verbal or may take the form of a natural physical gesture. The reaction 440 may be captured by a recognition module 445. The capture may use a microphone, a camera, and/or other motion sensing device. At the recognition module 445, the reaction 440 may be analyzed to infer an opinion 450 of the user 435. In an embodiment, the inferred opinion 450 may be binary, i.e., positive or negative, like or dislike. Alternatively, the inferred opinion 450 maybe more nuanced, and may represent a degree of like or dislike.

The opinion 450 may be passed to a mapping module 455. Here, the opinion 450 may be combined with metadata 420 from the content services device 425. These pieces of information may be combined with identity information for the user, to form interest information 465. The interest information 465 may then be passed to a database 470, via network 460. In this embodiment, the database 470 may be located at a location separate from the user's location. Moreover, FIG. 4 shows a single network 463 through which interest information 465 is passed to database 470, and through which advertisement 410 and metadata 420 are received at the user's location. Alternatively, different networks may be used for these purposes.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, ROM, RAM, or other data storage device.

In an embodiment, some or all of the processing described herein may be implemented as software or firmware. Such a software or firmware embodiment is illustrated in the context of a computing system 500 in FIG. 5. System 500 may include a central processing unit (CPU) 520 and a body of memory 510 that may include one or more non-transitory computer readable media that may store computer program logic 540. Memory 510 may be implemented as a read-only memory (ROM) or random access memory (RAM) device, for example. CPU 520 and memory 510 may be in communication using any of several technologies known to one of ordinary skill in the art, such as a bus. Computer program logic 540 contained in memory 510 may be read and executed by CPU 520. In an embodiment. One or more I/O ports and/or I/O devices, shown collectively as I/O 530, may also be connected to CPU 520 and memory 510.

Figure 5:
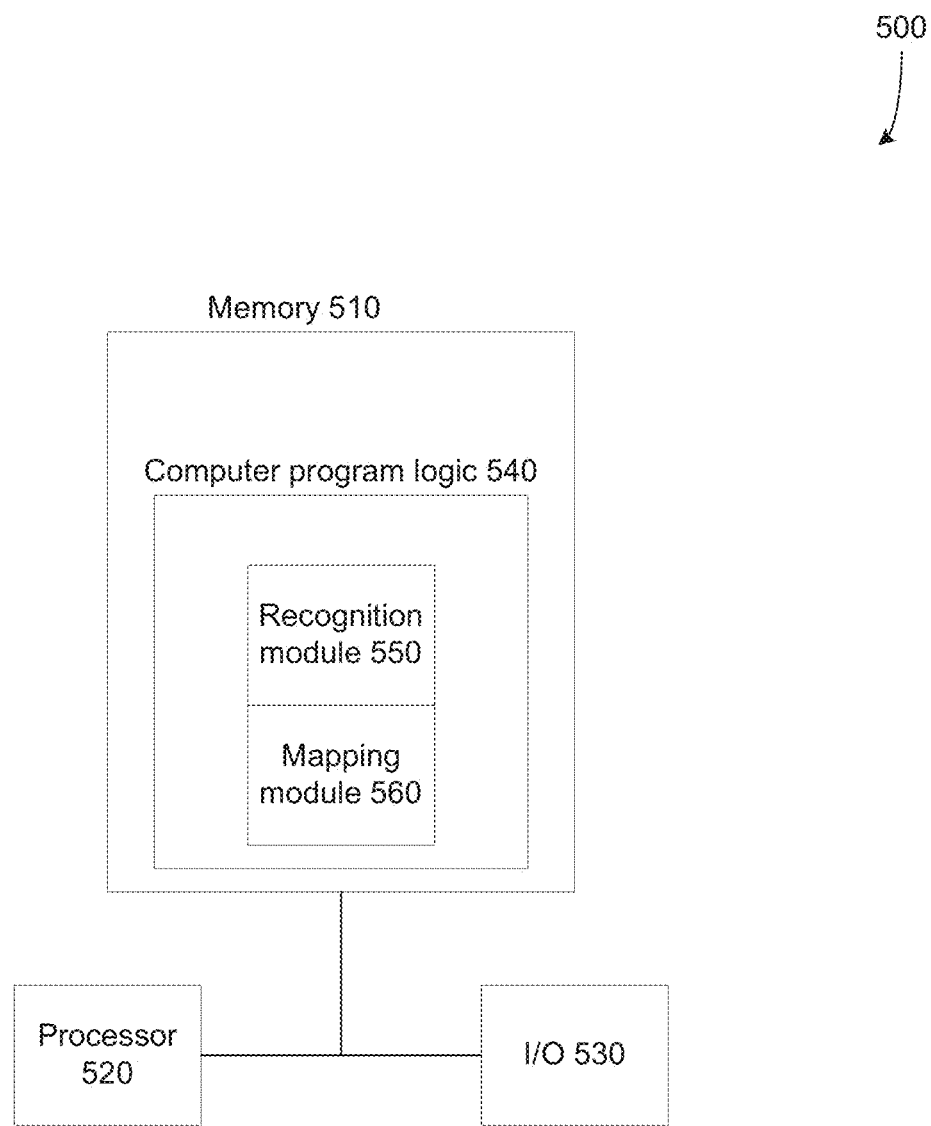
FIG. 5 is a block diagram illustrating a software or firmware embodiment of the functionality described herein, according to an embodiment.

In the embodiment of FIG. 5, computer program logic 540 may include recognition module 550, which may be responsible for recognizing the reaction of a user and interpreting the reaction to infer the opinion of the user with regard to an advertisement. Computer program logic 540 may also include mapping module 560. This module may be responsible for mapping the opinion of the user, as generated by recognition module 550, to the metadata of the advertisement and to the identity of the user. The resulting interest information may then be sent to a database or other data structure and made available to other parties, such as advertisers.

Figure 6:
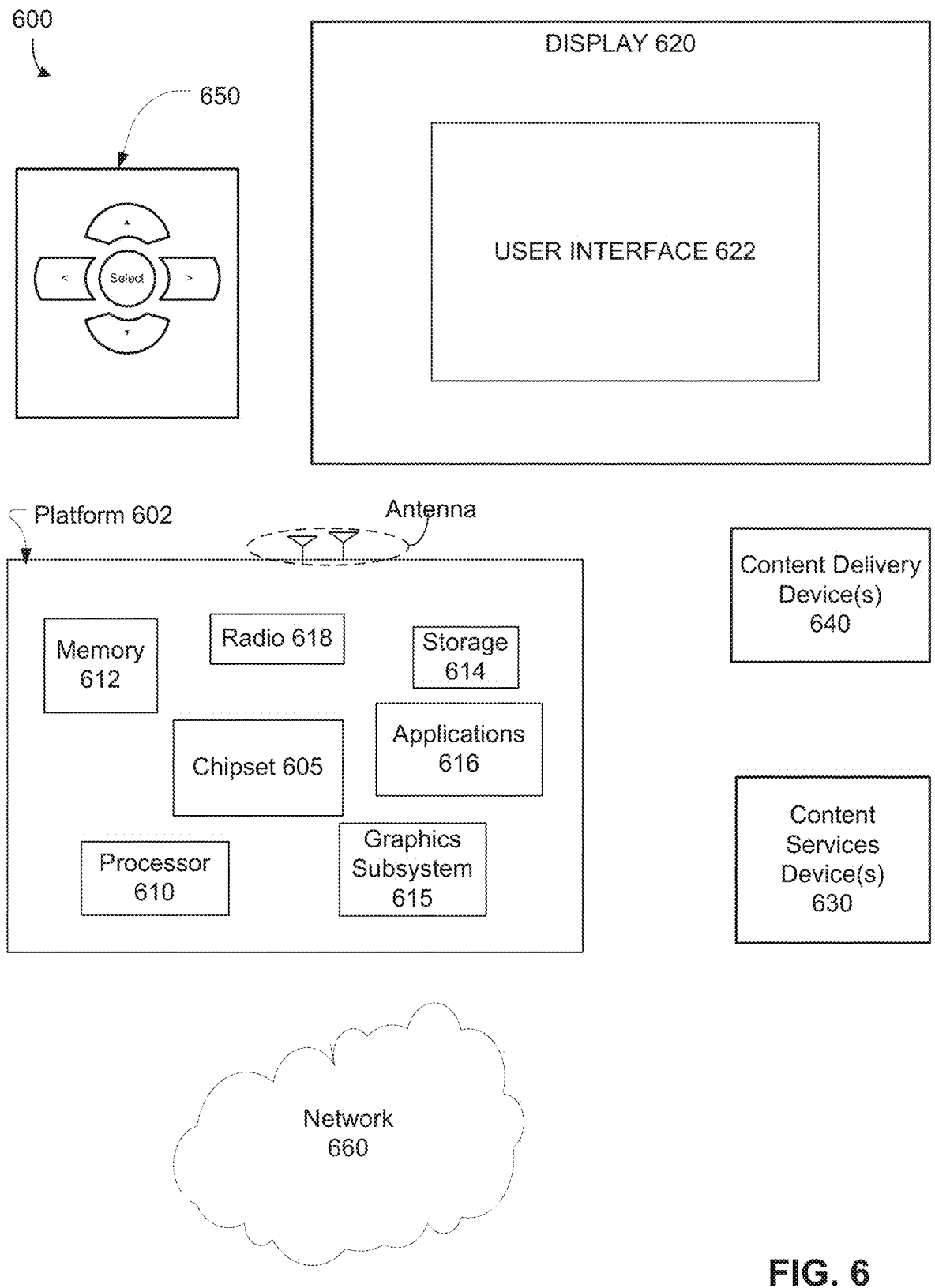
FIG. 6 is a diagram illustrating the context in which these systems described herein may be incorporated, according to an embodiment.

FIG. 6 illustrates an embodiment of a system 600, where some of the functionality of the system of FIG. 4 may be incorporated in a platform 602. In embodiments, system 600 may be a media system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 600 comprises platform 602 coupled to a display 620. Platform 602 may receive content from a content device such as content services device(s) 630 or content delivery device(s) 640 or other similar content sources. A navigation controller 650 comprising one or more navigation features may be used to interact with for example, platform 602 and/or display 620. Each of these components is described in more detail below.

In embodiments, platform 602 may comprise any combination of a chipset 605, processor 610, memory 612, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor 610 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 610 may comprise single or dual-core processor(s), dual-core mobile processor(s), and so forth. In an embodiment, processor 610 may correspond to CPU 520 of FIG. 5.

Memory 612 may be implemented as a volatile memory device such as, but not limited to, a Random Access Memory (RAM), Dynamic Random Access Memory (DRAM), or Static RAM (SRAM).

Storage 614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 614 may comprise technology to increase the storage performance enhanced protection for valuable digital media when multiple hard drives are included, for example. In an embodiment, memory 510 of FIG. 5 may correspond to storage 614 and/or memory 612 of FIG. 6.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 618 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In embodiments, display 620 may comprise any television type monitor or display. Display 620 may comprise, for example, a computer display screen, touch screen display, video monitor, television-like device, and/or a television. Display 620 may be digital and/or analog. In embodiments, display 620 may be a holographic display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display user interface 622 on display 620. In an embodiment, display 620 may correspond to display 435 of FIG. 4.

In embodiments, content services device(s) 630 may be hosted by any national, international and/or independent service and thus accessible to platform 602 via, the Internet, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620. In an embodiment, content services device(s) may correspond to content services device 425 of FIG. 4.

In embodiments, content services device(s) 630 may comprise a cable television (e.g., set-top) box, personal computer, network, telephone, Internet enabled devices or appliance capable of delivering digital information and/or content, and any other similar device capable of unidirectionally or bidirectionally communicating content between content providers and platform 602 and/display 620, via network 660 or directly. It will be appreciated that the content may be communicated unidirectionally and/or bidirectionally to and from any one of the components in system 600 and a content provider via network 660. Examples of content may include any media information including, for example, video, music, medical and gaming information, and so forth.

Content services device(s) 630 receives content such as cable television programming including media information, digital information, and/or other content. Examples of content providers may include any cable or satellite television or radio or Internet content providers. The provided examples are not meant to limit embodiments of the invention.

In embodiments, platform 602 may receive control signals from navigation controller 650 having one or more navigation features. The navigation features of controller 650 may be used to interact with user interface 622, for example. In embodiments, navigation controller 650 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 650 may be echoed on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In embodiments, controller 650 may not be a separate component but integrated into platform 602 and/or display 620. Embodiments, however, are not limited to the elements or in the context shown or described herein.

In embodiments, drivers (not shown) may comprise technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 when the platform is turned "off" in addition, chip set 605 may comprise hardware and/or software support for 5.1 surround sound audio and/or high definition 6.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the invention.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
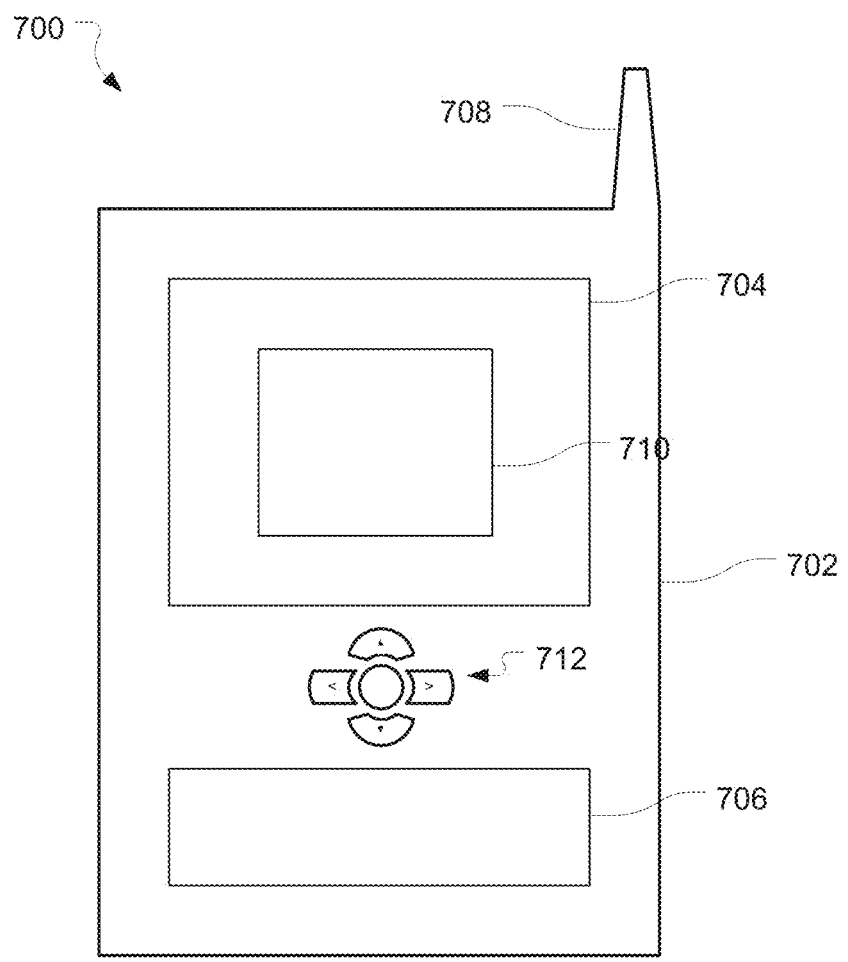
FIG. 7 illustrates a user device which may incorporate components of the system described herein, according to an embodiment.

As described above, system 600 may be embodied in varying physical styles or form factors. FIG. 7 illustrates embodiments of a small form factor device 700 in which system 600 may be embodied. In embodiments, for example, device 700 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may comprise a housing 702, a display 704, an input/output (I/O) device 706, and an antenna 708. Device 700 also may comprise navigation features 712. Display 704 may comprise any suitable display unit for displaying information appropriate for a mobile computing device. I/O device 706 may comprise any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone. Such information may be digitized by a voice recognition device. The embodiments are not limited in this context.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. One or more non-transitory computer-readable media having instructions stored thereon that, when executed on a computing device, cause the computing device to:
   present a first advertisement comprising an audio prompt;
   receive a reaction to the audio prompt, the reaction comprising a verbal reaction, a gesture reaction, or a verbal reaction and a gesture reaction;
   associate the reaction with a user;
   interpret the reaction to infer an opinion of the user with respect to the first advertisement;
   receive metadata associated with the first advertisement;
   map the opinion to the metadata to form interest information for the user;
   add the interest information to a database;
   share the database with at least one or more additional parties, the one or more additional parties different than an advertiser of the first advertisement and including a competitor to the advertiser;
   receive an information element from the competitor, the information element comprising an indication of a second advertisement, the second advertisement relevant to the first advertisements and selected based on the interest information generated by mapping the opinion to the metadata; and
   present the second advertisement to the user.

2. The one or more computer-readable media of claim 1, wherein the metadata comprises pricing, availability, product details, or availability of a product or service advertised in the first advertisement.

3. A computing device comprising:
   one or more processors; and
   at least one computer-readable media having instructions stored thereon that, when executed on the computing device, cause the computing device to:
   present a first advertisement comprising an audio prompt;
   receive a reaction to the audio prompt, the reaction comprising one or more of a verbal reaction or a gesture reaction;
   associate the reaction with a user;
   interpret the reaction to infer an opinion of the user with respect to the first advertisement;
   receive metadata associated with the first advertisement;
   map the opinion to the metadata to form interest information for the user;
   add the interest information to a database;
   share the database with at least one or more additional parties, the one or more additional parties different than an advertiser of the first advertisement and including a competitor to the advertiser;
   receive an information element from the competitor, the information element comprising an indication of a second advertisement, the second advertisement relevant to the first advertisements and selected based on the interest information generated by mapping the opinion to the metadata; and
   present the second advertisement to the user.

4. The computing device of claim 3, wherein the metadata comprises pricing, availability, product details, or availability of a product or service advertised in the first advertisement.

5. The computing device of claim 3, wherein the second advertisement comprises a second audio prompt, the instructions further comprising instructions that, when executed on the computing device, cause the computing device to:
   receive a second reaction to the second audio prompt, the second reaction comprising one or more of a second verbal reaction or second gesture reaction;
   interpret the second reaction to infer a second opinion of the user with respect to the second advertisement;
   receive second metadata associated with the second advertisement;
   map the second opinion to the second metadata to form updated interest information for the user; and present further additional advertising information or further information related to the first advertisement and the second advertisement based at least in part on the updated interest information.

6. A computing device comprising:
means for presenting a first advertisement comprising an audio prompt;
means for receiving a reaction, the reaction comprising one or more of a verbal reaction or gesture reaction to the audio prompt;
means for associating the reaction with a user;
means for interpreting the reaction to infer an opinion of the user with respect to the first advertisement;
means for receive metadata associated with the first advertisement;
means for mapping the opinion to the metadata to form interest information for the user;
means for adding the interest information to a database;
means for sharing the database with at least one or more additional parties, the one or more additional parties different than an advertiser of the first advertisement and including a competitor to the advertiser;
means for receiving an information element from the competitor, the information element comprising an indication of a second advertisement, the second advertisement relevant to the first advertisements and selected based on the interest information generated by mapping the opinion to the metadata; and
means for presenting the second advertisement to the user.

7. The computing device of claim 6, wherein the second advertisement comprises a second audio prompt, further comprising:
means for receiving a second reaction to the second audio prompt, the second reaction comprising one or more of a second verbal reaction or gesture reaction;
means for interpreting the second reaction to infer a second opinion of the user with respect to the second advertisement;
means for receiving second metadata associated with the second advertisement;
means for mapping the second opinion to the second metadata to form updated interest information for the user; and
means for presenting further additional advertising information or further information related to the first advertisement and the second advertisement based at least in part on the updated interest information.

8. One or more non-transitory computer-readable media having instructions stored thereon that, when executed on a system, cause the system to:
provide first advertisement comprising an audio prompt to a computing device;
receive, from the computing device, information associated with a reaction to the audio prompt, the reaction comprising a verbal reaction, a gesture reaction, or a verbal reaction and a gesture reaction;
associate the reaction with a user of the computing device;
interpret the reaction to infer an opinion of the user with respect to the first advertisement;
map the opinion to metadata of the first advertisement to form interest information for the user;
add the interest information to a database;
share the database with at least one or more additional parties, the one or more additional parties different than an advertiser of the first advertisement and including a competitor to the advertiser;
select a second advertisement from the competitor, the second advertisement being related to the first advertisement and based at least in part on the interest information generated by mapping the opinion to the metadata; and
provide the second advertisement to the computing device.

9. The one or more computer-readable media of claim 8, wherein the metadata comprises pricing, availability, product details, or availability of a product or service advertised in the first advertisement.

10. The one or more computer-readable media of claim 8, wherein the second advertisement comprises a second audio prompt, the instructions further comprising instructions that, when executed on the system, cause the system to:
receive, from the computing device, information associated with one or more of a second reaction to the second audio prompt, the second reaction comprising a second verbal or second gesture reaction;
interpret the second reaction to infer a second opinion of the user with respect to the second advertisement;
map the second opinion to second metadata associated with the second advertisement to form updated interest information for the user; and
provide to the computing device further additional advertising information or further information related to the first advertisement and the second advertisement to the computing device based at least in part on the updated interest information.

11. A method comprising:
providing first advertisement comprising an audio prompt to a computing device;
receiving, from the computing device, information associated with a reaction to the audio prompt, the reaction comprising a verbal reaction, a gesture reaction, or a verbal reaction and a gesture reaction;
associating the reaction with a user of the computing device;
interpreting the reaction to infer an opinion of the user with respect to the first advertisement;
mapping the opinion to metadata of the first advertisement to form interest information for the user;
adding the interest information to a database;
sharing the database with at least one or more additional parties, the one or more additional parties different than an advertiser of the first advertisement and including a competitor to the advertiser;
selecting a second advertisement from the competitor, the second advertisement being related to the first advertisement and based at least in part on the interest information generated by mapping the opinion to the metadata; and
providing the second advertisement to the computing device.

12. The method of claim 11, wherein the metadata comprises pricing, availability, product details, or availability, of a product or service advertised in the first advertisement.

13. A system comprising:
one or more processors; and
at least one computer-readable media having instructions stored thereon that, when executed on the system, cause the system to:
provide a first advertisement comprising an audio prompt to a computing device;
receive, from the computing device, information associated with a reaction to the audio prompt, the reaction comprising a verbal reaction, a gesture reaction, or a verbal reaction and a gesture reaction;

associate the reaction with a user of the computing device;

interpret the reaction to infer an opinion of the user with respect to the first advertisement;

map the opinion to metadata of the first advertisement to form interest information for the user;

add the interest information to a database;

share the database with at least one or more additional parties, the one or more additional parties different than an advertiser of the first advertisement and including a competitor to the advertiser;

select a second advertisement from the competitor, the second advertisement being related to the first advertisement and based at least in part on the interest information generated by mapping the opinion to the metadata; and provide the second advertisement to the computing device.

14. The system of claim 13, wherein the metadata comprises pricing, availability, product details, or availability, of a product or service advertised in the first advertisement.

15. The system of claim 13, wherein the second advertisement comprises a second audio prompt, the instructions further comprising instructions that, when executed on the system, cause the system to:

receive, from the computing device, information associated with one or more of a second reaction to the second audio prompt, the second reaction comprising a second verbal or second gesture reaction;

interpret the second reaction to infer a second opinion of the user with respect to the second advertisement;

map the second opinion to second metadata associated with the second advertisement to form updated interest information for the user; and provide to the computing device further additional advertising information or further information related to the first advertisement and the second advertisement to the computing device based at least in part on the updated interest information.

16. A system comprising:

means for providing a first advertisement comprising an audio prompt to a computing device;

means for receiving, from the computing device, information associated with a reaction to the audio prompt, the reaction comprising a verbal reaction, a gesture reaction, or a verbal reaction and a gesture reaction;

means for associating the reaction with a user of the computing device;

means for interpreting the reaction to infer an opinion of the user with respect to the first advertisement;

means for mapping the opinion to metadata of the first advertisement to form interest information for the user;

means for adding the interest information to a database;

means for sharing the database with at least one or more additional parties, the one or more additional parties different than an advertiser of the first advertisement and including a competitor to the advertiser;

means for selecting a second advertisement from the competitor, the second advertisement being related to the first advertisement and based at least in part on the interest information generated by mapping the opinion to the metadata; and means for provide the second advertisement to the computing device.

17. The system of claim 16, wherein the metadata comprises pricing, availability, product details, or availability, of a product or service advertised in the first advertisement.

18. The system of claim 16, wherein the second advertisement comprises a second audio prompt, and further comprising:

means for receiving, from the computing device, information associated with one or more of a second reaction to the second audio prompt, the second reaction comprising a second verbal or second gesture reaction;

means for interpreting the second reaction to infer a second opinion of the user with respect to the second advertisement;

means for mapping the second opinion to second metadata associated with the second advertisement to form updated interest information for the user; and means for providing to the computing device further additional advertising information or further information related to the first advertisement and the second advertisement to the computing device based at least in part on the updated interest information.

* * * * *